United States Patent
Ichinose et al.

(10) Patent No.: US 7,147,389 B2
(45) Date of Patent: Dec. 12, 2006

(54) FOCAL PLANE SHUTTER

(75) Inventors: Shuji Ichinose, Koriyama (JP); Yutaka Okazaki, Koriyama (JP); Takao Ogawa, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 15 days.

(21) Appl. No.: 10/827,423

(22) Filed: Apr. 20, 2004

(65) Prior Publication Data

US 2004/0213561 A1 Oct. 28, 2004

(30) Foreign Application Priority Data

Apr. 22, 2003 (JP) ............... 2003-116882

(51) Int. Cl.
G03B 9/08 (2006.01)

(52) U.S. Cl. ...................... 396/488; 396/452

(58) Field of Classification Search ................ 396/484, 396/486–488, 452, 453, 456
See application file for complete search history.

(56) References Cited

U.S. PATENT DOCUMENTS

2001/0053288 A1 12/2001 Ito et al.
2003/0128976 A1* 7/2003 Ichinose et al. ............ 396/484
2004/0042787 A1* 3/2004 Miyazaki ................... 396/484

FOREIGN PATENT DOCUMENTS

| JP | 11-64925 | 3/1999 |
|---|---|---|
| JP | 2001-157087 | 6/2001 |
| JP | 2001-298640 | 10/2001 |
| JP | 2001-311997 | 11/2001 |
| JP | 2002-156685 | 5/2002 |

* cited by examiner

Primary Examiner—W. B. Perkey
Assistant Examiner—Rishi Suthar
(74) Attorney, Agent, or Firm—Roberts Mlotkowski & Hobbes; Thomas W. Cole

(57) ABSTRACT

A focal plane shutter has a light shielding shutter blade. A blade dowel is attached to the shutter blade. A blade arm is slidably engaged with the blade dowel to open or close the shutter blade. A surface hardness of the blade dowel is higher than a surface hardness of the blade arm. The surface hardness of the blade arm is Hv300 to 900, and the surface hardness of the blade dowel is Hv450 to 1000. The blade arm and the blade dowel are subjected to chemical polishing treatment. The blade dowel is plated with nickel, chromium, palladium or rhodium. A material of the blade dowel is a free-cutting stainless steel or a carbon tool steel, and a material of the blade arm is a carbon tool steel or a titanium material.

2 Claims, 5 Drawing Sheets

|  | TREATMENT OF BLADE DOWEL | TREATMENT OF BLADE ARM | JUDGMENT | STATE OF ABRASION POWDER AFTER DURABILITY TEST |
|---|---|---|---|---|
| COMPARATIVE EXAMPLE 2 | SUS416BFS | TITANIUM MATERIAL +NITRIDING TREATMENT +LUBRICATING COATING | × (D) | METAL ABRASION POWDER OF 10 $\mu$m OR LAGER IS GENERATED, MAINLY ABRASION POWDER OF SUS DOWEL |
| EMBODIMENT 2 | SUS416BFS +CHEMICAL POLISHING +Pd PLATING | TITANIUM MATERIAL +CHEMICAL POLISHING +NITRIDING TREATMENT +LUBRICATING COATING | ◎ (A) | 10 $\mu$m OR LESS, METAL COMPONENTS ARE NOT DETECTED, MAINLY DUST |

FIG. 2

| | TREATMENT OF BLADE DOWEL | TREATMENT OF BLADE ARM | JUDGMENT | STATE OF ABRASION POWDER AFTER DURABILITY TEST |
|---|---|---|---|---|
| COMPARATIVE EXAMPLE 1 | SUS416BFS | SK4 +BLACK DYEING | × (D) | METAL ABRASION POWDER OF 10 μm OR LAGER IS GENERATED, MAINLY ABRASION POWDER OF SUS DOWEL |
| EMBODIMENT 1 | SUS416BFS +CHEMICAL POLISHING +Pd PLATING | SK4 +CHEMICAL POLISHING +BLACK DYEING | ◎ (A) | 10 μm OR LESS, METAL COMPONENTS ARE NOT DETECTED, MAINLY DUST |

FIG. 3

| | TREATMENT OF BLADE DOWEL | TREATMENT OF BLADE ARM | JUDGMENT | STATE OF ABRASION POWDER AFTER DURABILITY TEST |
|---|---|---|---|---|
| COMPARATIVE EXAMPLE 2 | SUS416BFS | TITANIUM MATERIAL +NITRIDING TREATMENT +LUBRICATING COATING | × (D) | METAL ABRASION POWDER OF 10 $\mu$m OR LAGER IS GENERATED, MAINLY ABRASION POWDER OF SUS DOWEL |
| EMBODIMENT 2 | SUS416BFS +CHEMICAL POLISHING +Pd PLATING | TITANIUM MATERIAL +CHEMICAL POLISHING +NITRIDING TREATMENT +LUBRICATING COATING | ◎ (A) | 10 $\mu$m OR LESS, METAL COMPONENTS ARE NOT DETECTED, MAINLY DUST |

FIG. 4

| | TREATMENT OF BLADE DOWEL | TREATMENT OF BLADE ARM | JUDGMENT | STATE OF ABRASION POWDER AFTER DURABILITY TEST |
|---|---|---|---|---|
| COMPARATIVE EXAMPLE 3 | SK4 +THERMAL TREATMENT +BLACK DYEING | SK4 +BLACK DYEING | × (D) | METAL ABRASION POWDER OF 10 µm OR LAGER IS GENERATED, ABRASION POWDER OF ARM AND DOWEL |
| EMBODIMENT 3 | SK4 +THERMAL TREATMENT +CHEMICAL POLISHING +Pd PLATING | SK4 +CHEMICAL POLISHING +BLACK DYEING | ◎ (A) | 10 µm OR LESS, METAL COMPONENTS ARE NOT DETECTED, MAINLY DUST |

FIG. 5

| | TREATMENT OF BLADE DOWEL | TREATMENT OF BLADE ARM | JUDGMENT | STATE OF ABRASION POWDER AFTER DURABILITY TEST |
|---|---|---|---|---|
| COMPARATIVE EXAMPLE 4 | SK4 +THERMAL TREATMENT +BLACK DYEING | TITANIUM MATERIAL +NITRIDING TREATMENT +LUBRICATING COATING | × (D) | METAL ABRASION POWDER OF 10 μm OR LAGER IS GENERATED, ABRASION POWDER OF SK DOWEL |
| EMBODIMENT 4 | SK4 +THERMAL TREATMENT +CHEMICAL POLISHING +Pd PLATING | TITANIUM MATERIAL +CHEMICAL POLISHING +NITRIDING TREATMENT +LUBRICATING COATING | ◎ (A) | 10 μm OR LESS, METAL COMPONENTS ARE NOT DETECTED, MAINLY DUST |

FOCAL PLANE SHUTTER

BACKGROUND OF THE INVENTION

1. Technical Field of the Invention

The present invention relates to a focal plane shutter apparatus, more concretely to a focal plane shutter apparatus assembled particularly in a digital camera which is required to reduce an amount of abrasion powder generated by the sliding of components as much as possible.

2. Prior Art

A focal plane shutter apparatus is composed of a plurality of light shielding blades, a dowel caulked or otherwise integrally attached to each blade, and an arm which is slidably engaged with the dowel to open or close each blade.

Herein below listed are patent documents of the prior art. Patent Document 1 is Japanese Patent Application Laid-Open No. 2001-157087. Patent Document 2 is Japanese Patent Application Laid-Open No. 2001-311997. Patent Document 3 is Japanese Patent Application Laid-Open No. 2002-010137.

When the blades are opened and closed, the arm and dowel frictionally slide with each other and abrasion powder is generated. In a conventional camera using a silver film, the film is wound up every exposure operation, and therefore the abrasion powder generated in the focal plane shutter apparatus assembled in the camera is not accumulated. However, in a digital camera, image pickup devices such as CCD are used instead of the silver film. When the focal plane shutter apparatus assembled in the digital camera is repeatedly driven, the abrasion powder is generated by the rubbing of the arm and dowel with the open or close operation of the blades. When the abrasion powder is accumulated in an imaging frame, picture quality is lowered, and this is a problem to be solved.

It is to be noted that several abrasion powder countermeasures have heretofore been proposed. For example, in Patent Document 1, an image pickup apparatus has been proposed which is equipped with a dust mode for detecting foreign materials on the CCD and a cleaning mode for cleaning the foreign materials. These modes can quickly be switched. When the foreign materials on the CCD are detected and indicated in the dust mode, the mode quickly shifts to the cleaning mode, and a cleaning operation can be performed.

In Patent Document 2, an electronic camera has been proposed in which an optical low pass filter is inserted between a focal plane shutter and an image pickup device. This low pass filter prevents an image quality from being deteriorated by the abrasion powder generated from the focal plane shutter.

Further in Patent Document 3, an electronic camera has been proposed in which the low pass filter can be moved during an exposure operation. Even when dust is attached to the low pass filter, the filter is moved during the exposure operation, the shadow of the dust is dispersed into a plurality of pixels, and the quality of the image obtained by the image pickup device is prevented from being deteriorated. However, any of these abrasion powder countermeasures is devised on the fact that the abrasion powder is generated, and is not a fundamental countermeasure to eliminate the abrasion powder itself.

SUMMARY OF THE INVENTION

An object of the present invention is to provide a focal plane shutter apparatus in which the generation of the abrasion powder can effectively be inhibited.

To solve the above-described conventional technical problem, the following means is taken. That is, according to a first aspect of the present invention, there is provided a focal plane shutter comprising a shutter blade capable of blocking or shielding an incident light, a blade dowel attached to the shutter blade, and a blade arm which is slidably engaged with the blade dowel to open or close the shutter blade, wherein a surface hardness of the blade dowel is higher than a surface hardness of the blade arm, the surface hardness of the blade arm is in the range of Hv300 to 900, and the surface hardness of the blade dowel is in the range of Hv450 to 1000, the blade arm and the blade dowel are subjected to chemical polishing treatment, the blade dowel is plated with nickel, chromium, palladium or rhodium, and a material of the blade dowel is a free-cutting stainless steel such as SUS 416 material or a carbon tool steel as known as SK material in JIS G4401, and a material of the blade arm is a carbon tool steel such as SK material.

According to a second aspect of the present invention, there is provided a focal plane shutter comprising a shutter blade capable of blocking or shielding an incident light, a blade dowel attached to the shutter blade, and a blade arm which is slidably engaged with the blade dowel to open or close the shutter blade, wherein a surface hardness of the blade dowel is higher than a surface hardness of the blade arm, the surface hardness of the blade arm is in the range of Hv300 to 900, and the surface hardness of the blade dowel is in the range of Hv450 to 1000, the blade arm and the blade dowel are subjected to chemical polishing treatment, the blade dowel is plated with nickel, chromium, palladium or rhodium, and a material of the blade dowel is a free-cutting stainless steel rod such as SUS 416 material or a carbon tool steel such as SK material, and a material of the blade arm is a titanium material.

As a result of inspection of foreign materials accumulated in an imaging frame of a digital camera using image pickup devices such as CCD, and as a result of durability test, it has been found that these foreign materials are abrasion powder generated from a conventional focal plane shutter apparatus, and further inspection about the source of the powder showed that most of abrasion powder has been generated by sliding movement between the blade arm and the blade dowel. The abrasion powder has a particle diameter of about several tens of micrometers, and it has been found that a considerable amount of powder is generated.

As a result of various studies of a combination of materials and surface treatments by which the abrasion powder is not easily generated by sliding, an SK material or a titanium material is selected for a blade arm, and burrs generated by press-cutting are removed from the blade arm by chemical polishing. The surface hardness of the blade arm is Hv300 to 900 in Vickers hardness. For a blade dowel, an SUS 416 material or the SK material is selected, and the burrs produced in a preprocess are removed from the dowel by chemical polishing. On this, dowel a hard chromium plating (surface hardness of Hv700 to 800), a chemical nickel plating (Hv500 to 600), a palladium plating (Hv450 to 550) or a rhodium plating (Hv800 to 900) is formed. The surface hardness of the blade dowel is Hv450 to 1000. When the surface hardness of the blade dowel is set to be higher than the surface hardness of the blade arm, it is possible to inhibit the abrasion of the blade dowel and it is possible to reduce the generation of the abrasion powder, which would deteriorate the image quality.

BRIEF DESCRIPTION OF THE DRAWINGS

FIG. 2 is a table diagram showing a durability test result of the focal plane shutter according to a first embodiment of the present invention.

FIG. 3 is a table diagram showing a durability test result of the focal plane shutter according to a second embodiment of the present invention.

FIG. 4 is a table diagram showing a durability test result of the focal plane shutter according to a third embodiment of the present invention.

FIG. 5 is a table diagram showing a durability test result of the focal plane shutter according to a fourth embodiment of the present invention.

DETAILED DESCRIPTION OF THE INVENTION

Figure 1A:
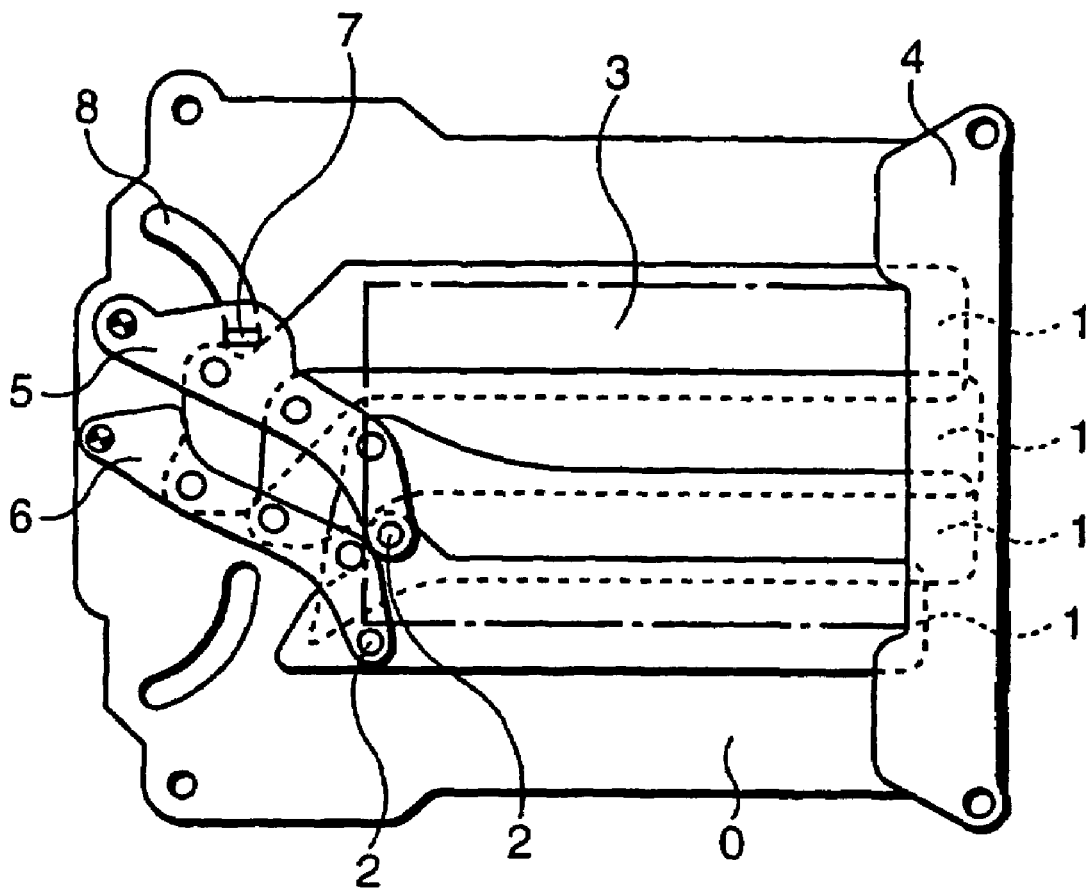
FIGS. 1(A) and 1(B) are schematic diagrams showing a focal plane shutter according to the present invention.
Figure 1B:
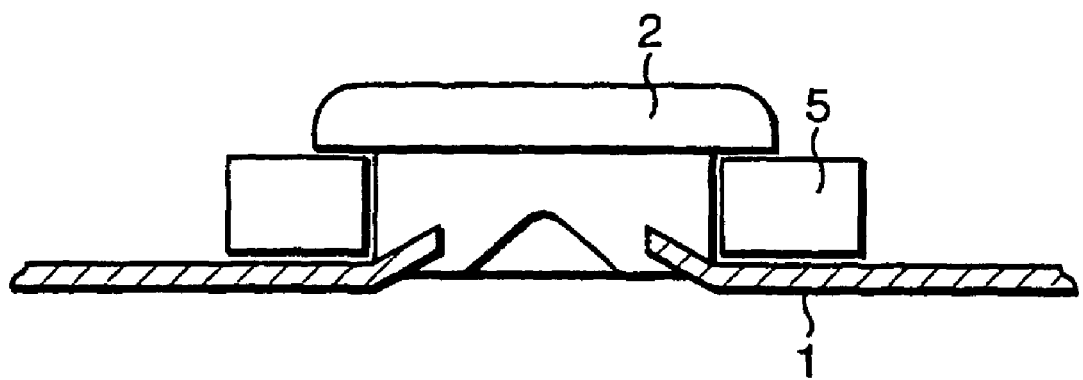

Embodiments of the present invention will be described hereinafter in detail with reference to the drawings. FIGS. 1(A) and 1(B) are diagrams schematically showing a focal plane shutter apparatus according to first, second, third and fourth embodiments of the present invention, FIG. 1(A) is a plan view, and FIG. 1(B) is a sectional view of the major part of the shutter. As shown in FIG. 1(A), the present focal plane shutter apparatus is assembled using a shutter substrate 0. A rectangular opening 3 (shown by a one-dot chain line) is formed in a center portion of the shutter substrate 0. In a resting state, four front blades 1 partially overlap with one another so that the shutter opening 3 is closed, though not shown, a rear blade group is overlapped and disposed below the front blade group.

An unnecessary movement of the tip end of each shutter blade 1 is restricted by a blade press 4. Dowels 2 formed of a metal are caulked or otherwise integrally attached to a root portion of each shutter blade 1. A pair of arms 5 and 6 are rotatably supported on a left end of the substrate 0, while keeping a mutual parallel relationship between the arms. The root portion of each front blade 1 is engaged with the arms 5 and 6 via the dowels 2. The rear blade group is similarly engaged with a pair of arms (not shown). The main arm 5 includes an elongated hole 7, and a long groove 8 is formed in the substrate 0 along a movement track of the elongated hole 7 with the rotation of the main arm 5. It is to be noted that a driving pin (not shown) extending through the substrate 0 is fitted into the elongated hole 7 via the groove 8. When a shutter release button (not shown) is pressed, the driving pin moves upwards by an urging force given along the elongated groove 8 formed in the substrate 0. Accordingly, the main arm 5 engaged with the driving pin in the elongated hole 7 and the connected sub arm 6 rotate and move upwards. By this rotation, the front blades 1 vertically run upwards, and open the opening 3. Subsequently, the rear blade group (not shown) vertically runs to close the opening 3 so that exposure finishes.

As shown in FIG. 1(B), a blade dowel 2 is caulked or otherwise integrally attached to a shutter blade 1. A blade arm 5 is slidably engaged with the blade dowel 2, and opens or closes the shutter blade 1. In such a configuration, the surface hardness of the blade dowel 2 is higher than the surface hardness of the blade arm 5. There is a possibility that an outer peripheral portion of the blade dowel 2 and an inner peripheral portion of a through-hole formed in the blade arm 5 frictionally slide on each other and abrasion powder is generated. In the present invention, an outer peripheral surface hardness of the blade dowel 2 is higher than an inner peripheral surface hardness of the through-hole formed in the blade arm 5. This can inhibit the generation of the abrasion powder. Concretely, the surface hardness of the blade arm 5 is about Hv300 to 900, whereas the surface hardness of the blade dowel 2 of the shutter blade 1 is set to about Hv450 to 1000. It is to be noted that the blade arm 5 and blade dowel 2 are subjected to chemical polishing treatment beforehand, and burrs which possibly cause the generation of the abrasion powder or the like and which are generated in a preprocessing are removed beforehand. Particularly, the blade dowel 2 is, in order to enhance the surface hardness, plated with nickel, chromium, palladium or rhodium. An SUS 416 material or an SK material is used for the material of the blade dowel 2. The SK material or titanium material is used for the blade arm 5. The material hardness of the blade dowel 2 and blade arm 5 is substantially equal, or the material hardness of the blade dowel 2 is higher.

Embodiment 1

A set of the blade dowel and blade arm for application to a focal plane shutter adapted to a shutter speed of ¼₀₀₀ second was produced as Embodiment 1, and was evaluated by a durability test. Details and durability test results of the blade dowel and blade arm are shown together in a table of FIG. 2. In addition, details and durability test results of Comparative Example 1 are also included in the table of FIG. 2.

Embodiment 1 uses SK4-CSP defined by the JIS standards as the material of the blade arm. The SK4-CSP is a carbon tool steel band. This arm is subjected to chemical polishing and further to a black dyeing treatment. The chemical polishing treatment comprises the steps of immersing a metal component processed beforehand in an arm shape into a chemical polishing solution, and dissolving the surface to remove the burrs. A dimension change by the chemical polishing is a loss of about 1 to 2 μm. As the chemical polishing solution, CPL-100 manufactured by Mitsubishi Gas Chemical Co., Inc. is used, and an immersion time is about ten seconds at room temperature. Moreover, the black dyeing treatment comprises the steps of immersing an iron or steel component into a strong alkali aqueous solution at high temperature, and forming a black oxide film of iron oxide ($Fe_3O_4$). Furthermore, when a chromate treatment by chromic anhydride or potassium bichromate is additionally used, corrosion resistance is enhanced, and this material is broadly used in components requiring reflection prevention such as camera components. The present embodiment includes these treatments of black dyeing.

The blade dowel of Embodiment 1 uses an SUS 416 BFS material. This material is one defined by JIS standard SUS416 among free-cutting stainless steel rods. The SUS 416 material is processed into a blade dowel shape before subjected to a chemical polishing treatment. By the chemical polishing treatment, the surface of the blade dowel becomes smooth. It is further plated with palladium (Pd). When the palladium plating is performed, the surface hardness is about Hv450 to 550.

On the contrary, Comparative Example 1 uses the same SK4 material as that of Embodiment 1 for the material of the blade arm, but it is not subjected to the chemical polishing treatment. Moreover, the SUS 416 material, which is the same as that of Embodiment 1, is used for material of the blade dowel, but it is not subjected to the chemical polishing and Pd plating.

The blade arms and blade dowels of Embodiment 1 and Comparative Example 1 are assembled into a focal plane shutter shown in FIG. 1, and 30000 times of open and close operations were performed with a shutter speed of 1/4000, and thus durability tests were carried out. The amount and particle diameter of the abrasion powder generated as a result were inspected. For the generated amount of the abrasion powder, the qualitative judgment was performed, and the judgment results were expressed with marks such as X(D), Δ(C), ○(B) and ⊙(A). The mark X(D) indicates a level having a significantly large amount of abrasion powder, which is followed by Δ(C), ○(B), and the mark ⊙ (A) indicates a level having a significantly small generated amount of abrasion powder. As a result of 30000 durability tests performed with respect to Comparative Example 1, a significant amount of abrasion powder is generated, resulting in a judgment X(D). This abrasion powder has a particle diameter of 10 μm or larger, and most of the abrasion powder is generated from stainless steel which is a material of the blade dowel. The set of the blade arm and blade dowel of Comparative Example 1 is not suitable for a shutter component for digital cameras. On the contrary, the durability test of Embodiment 1 shows ⊙ (A) with a significantly small amount of abrasion powder. Analysis of the abrasion powder has revealed that the particle diameter is 10 μm or less, and metal components were not detected, and it is mainly dust floating in the air. The set of the blade arm and blade dowel of Embodiment 1 is suitable for the shutter component for digital cameras.

Embodiment 2

A set of the blade dowel and blade arm for application to the focal plane shutter adapted to a shutter speed of 1/8000 second was produced as Embodiment 2, and was evaluated by the durability test. Details and durability test results of the blade dowel and blade arm are shown together in a table of FIG. 3. In addition, details and durability test results of Comparative Example 2 are also included in the table of FIG. 3.

The blade arm of Embodiment 2 uses, as an arm material, a titanium material which is lighter and suitable for high-speed running, instead of SK4. This blade arm is subjected to the chemical polishing as well as a nitriding treatment and lubricating coating. The chemical polishing treatment comprises immersing a titanium material component processed beforehand in a blade arm shape into a chemical polishing solution, and dissolving the surface to remove the burrs. The nitriding treatment comprises infiltrating and diffusing nitrogen in the blade arm surface to increase abrasion resistance and fatigue resistance (fatigue strength) of the surface. Moreover, the lubricating coating comprises an acrylic resin to which carbon black having electro-conducting properties and PTFE (polytetrafluoroethylene) having lubricating properties are added. The quantity of the resin in the coating film is in a range of 70 to 80 wt %, and it can reduce scratches and light reflex on a coating film surface. The quantity of carbon black in the coating film is 5 to 17 wt %, and it can reduce electrification of the coating film surface. Further, the quantity of PTFE in the coating film is 4 to 10 wt %, and it gives abrasion-resistant properties in addition to lubricating properties to the surface of the coating film.

The blade dowel of Embodiment 2 uses the SUS 416 BFS material. The SUS 416 material is processed into a blade dowel shape before subjected to the chemical polishing treatment. Furthermore, it is plated with palladium (Pd). These are the same as in the blade dowel of Embodiment 1.

On the contrary, Comparative Example 2 uses the same titanium material as that of Embodiment 2 for the material of the blade arm, but it is not subjected to the chemical polishing treatment. Moreover, the SUS 416 material, which is the same as that of Embodiment 2, is used for material of the blade dowel, but it is not subjected to the chemical polishing and Pd plating.

The blade arms and blade dowels of Embodiment 2 and Comparative Example 2 are assembled into the focal plane shutter shown in FIG. 1, and 50000 times of open and close operations were performed with a shutter speed of 1/8000, and thus durability tests were carried out. The amount and particle diameter of the abrasion powder generated as a result were inspected. As a result of 50000 times of tests performed with respect to Comparative Example 2, a significant amount of abrasion powder is generated, resulting in a judgment X(D). This abrasion powder has a particle diameter of 10 μm or larger, and most of the abrasion powder is generated from stainless steel which is a material of the blade dowel. The set of the blade arm and blade dowel of Comparative Example 2 is not suitable for the shutter component for digital cameras. On the contrary, the durability test of Embodiment 2 resulted in ⊙(A) with a significantly small amount of abrasion powder. Analysis of the abrasion powder has revealed that the particle diameter is 10 μm or less, and metal components were not detected, and it is mainly dust floating in the air. The set of the blade arm and blade dowel of Embodiment 2 is suitable for the shutter component for digital cameras.

Embodiment 3

A set of the blade dowel and blade arm for application to the focal plane shutter adapted to a shutter speed of 1/4000 second was produced as Embodiment 3, and was evaluated by the durability test. Details and durability test results of the blade dowel and blade arm are shown together in a table of FIG. 4. In addition, details and durability test results of Comparative Example 3 are also included in the table of FIG. 4.

The blade arm of Embodiment 3 uses, as a material, the SK4-CSP defined by the JIS standards. The SK4-CSP is a cold-rolled steel band for a spring. This blade arm is subjected to the chemical polishing and a black dyeing treatment. The chemical polishing treatment comprises immersing a metal component processed beforehand in the blade arm shape into the chemical polishing solution, and dissolving the surface to remove the burrs. A dimension change by the chemical polishing is a loss of about 1 to 2 μm. As the chemical polishing solution, CPL-100 manufactured by Mitsubishi Gas Chemical Co., Inc. is used, and an immersion time is about ten seconds at room temperature. Moreover, the black dyeing treatment comprises immersing an iron and steel component into a strong alkali aqueous solution at high temperature, and forming a black oxide film of triiron tetroxide ($Fe_3O_4$). Furthermore, when a chromate treatment by chromic anhydride or potassium bichromate is additionally used, corrosion resistance is enhanced, and this material is broadly used in components requiring reflection prevention such as camera components. The present embodiment includes all of these treatments.

The blade dowel of Embodiment 3 uses the SK4 material instead of the SUS 416 BFS material. The SK4 material is processed into a blade dowel shape before subjected to a thermal treatment and the chemical polishing treatment. The thermal treatment includes hardening, tempering and the like. When the thermal treatment is performed, the Vickers hardness of the material is about Hv350 to 450. By the chemical polishing treatment, the surface of the blade dowel becomes smooth. Furthermore, it is plated with palladium (Pd). When the palladium plating is performed, the surface hardness is about Hv450 to 550.

On the contrary, Comparative Example 3 uses the same SK4 material as that of Embodiment 3 for the material of the blade arm, but it is not subjected to the chemical polishing treatment. Moreover, the SK4 material, which is the same as that of Embodiment 3, is used for material of the blade dowel, but it is not subjected to the chemical polishing and Pd plating. Instead, it is subjected to the black dyeing treatment.

The blade arms and blade dowels of Embodiment 3 and Comparative Example 3 are combined into the focal plane shutter shown in FIG. 1, and 30000 times of open and close operations were performed with a shutter speed of 1/4000, and durability tests were carried out. The amount and particle diameter of the abrasion powder generated as a result were inspected. For the generated amount of the abrasion powder, the qualitative judgment was performed, and the judgment results were expressed with the marks such as X(D), Δ(C), ○(B) and ◎(A). The mark X(D) indicates a level having a significantly large amount of generated abrasion powder, which is followed by Δ(C), ○(B), and the mark ◎(A) indicates a level having a significantly small amount of generated abrasion powder. As a result of 30000 times of tests performed with respect to Comparative Example 3, a significant amount of abrasion powder is generated, resulting in a judgment X(D). This abrasion powder has a particle diameter of 10 μm or larger, and most of the abrasion powder is generated from the blade dowel and the blade arm. The set of the blade arm and blade dowel of Comparative Example 3 is not suitable for the shutter component for digital cameras. On the contrary, the durability test of Embodiment 3 resulted in ◎(A) with a significantly small amount of abrasion powder. Analysis of the abrasion powder has revealed that the particle diameter is 10 μm or less, and metal components were not detected, and it is mainly dust floating in the air. The set of the blade arm and blade dowel of Embodiment 3 is suitable for the shutter component for digital cameras.

Embodiment 4

A set of the blade dowel and blade arm for application to the focal plane shutter adapted to a shutter speed of 1/8000 second was produced as Embodiment 4, and was evaluated by the durability test. Details and durability test results of the blade dowel and blade arm are shown together in a table of FIG. 5. In addition, details and durability test results of Comparative Example 4 are also included in the table of FIG. 5.

The blade arm of Embodiment 4 uses, as an arm material, a titanium material which is lighter and suitable for high-speed running, instead of SK4. This blade arm is subjected to the chemical polishing as well as the nitriding treatment and lubricating coating. The chemical polishing treatment comprises immersing the titanium material component processed beforehand in the blade arm shape into the chemical polishing solution, and dissolving the surface to remove the burrs. The nitriding treatment comprises infiltrating and diffusing nitrogen into the blade arm surface to increase abrasion resistance and fatigue resistance (fatigue strength) of the surface. Moreover, the lubricating coating comprises an acrylic resin to which carbon black having electrically conducting properties and PTFE having lubricating properties are added. The quantity of the resin in the coating film is in a range of 70 to 80 wt %, and it can reduce scratches and light reflex on the coating film surface. The quantity of carbon black in the coating film is 5 to 17 wt %, and it can reduce electrification of the coating film surface. Further, the quantity of PTFE in the coating film is 4 to 10 wt %, and it gives abrasion-resistant properties in addition to lubricating properties to the surface of the coating film.

The blade dowel of Embodiment 4 also uses the SK4 material as a dowel material. The SK4 material is processed into a blade dowel shape before subjected to the thermal treatment and the chemical polishing treatment. The thermal treatment includes hardening, tempering and the like. When the thermal treatment is performed, the Vickers hardness of the material is about Hv350 to 450. By the chemical polishing treatment, the surface of the blade dowel becomes smooth. Furthermore, it is plated with palladium (Pd). When the palladium plating is performed, the surface hardness is about Hv450 to 550.

On the contrary, Comparative Example 4 uses the same titanium material as that of Embodiment 4 for the material of the blade arm, but it is not subjected to the chemical polishing treatment. Moreover, the SK4 material, which is the same as that of Embodiment 4, is used for material of the blade dowel, but it is not subjected to the chemical polishing and Pd plating. Instead, it is subjected to the black dyeing treatment.

The blade arms and blade dowels of Embodiment 4 and Comparative Example 4 are assembled into the focal plane shutter shown in FIG. 1, and 50000 times of open and close operations were performed with a shutter speed of 1/8000, and thus the durability tests were carried out. The amount and particle diameter of the abrasion powder generated as a result were inspected. As a result of 50000 times of tests performed with respect to Comparative Example 4, a significant amount of abrasion powder is generated, resulting in a judgment X(D). This abrasion powder has a particle diameter of 10 μm or larger, and Fe was detected by analysis. This is generated from the SK material of the blade dowel. The set of the blade arm and blade dowel of Comparative Example 4 is not suitable for the shutter component for digital cameras. On the contrary, the durability test of Embodiment 4 resulted in ◎(A) with a significantly small amount of abrasion powder. Analysis of the abrasion powder has revealed that the particle diameter is 10 μm or less, and metal components were not detected, and it is mainly dust floating in the air. The set of the blade arm and blade dowel of Embodiment 4 is suitable for the shutter component for digital cameras.

It is to be noted that the blade dowel is plated with Pd in all of Embodiment 1 to Embodiment 4, but may be chemically plated with nickel (Ni) instead. With the chemical nickel plating having a thickness of about 2.5 μm, the surface hardness increases to about Hv500 to 600. Alternatively, it may be plated with chromium (Cr). When a hard chromium plating is performed, the Vickers hardness reaches Hv700 to 800. Moreover, a rhodium plating has a hardness higher than that of the palladium plating, and further effect is anticipated.

As described above, according to the present invention, the surfaces of the blade arm and blade dowel are smoothed, and the surface hardness of the shutter blade dowel is improved, whereby it is possible to reduce the amount of abrasion powder generated by the shutter operation.

What is claimed is:

1. A focal plane shutter comprising: a shutter blade capable of blocking a light; a blade dowel attached to the shutter blade; and a blade arm which is slidably engaged with the blade dowel to open or close the shutter blade, the surface hardness of said blade arm is in the range of Hv300 to 900, and the surface hardness of said blade dowel is in the range of Hv450 to 1000, the respective surface hardnesses being selected with said ranges such that the surface hardness of said blade dowel is always higher than the surface hardness of said blade arm.

said blade arm and said blade dowel being subjected to a chemical polishing treatment, said blade dowel being plated with nickel, chromium, palladium or rhodium, and a material of said blade dowel is one of a free-cutting stainless steel and a carbon tool steel, and a material of said blade arm is a carbon tool steel.

2. A focal plane shutter comprising: a shutter blade capable of blocking a light; a blade dowel attached to the shutter blade; and a blade arm which is slidably engaged with the blade dowel to open or close the shutter blade, the surface hardness of said blade arm is in the range of Hv300 to 900, and the surface hardness of said blade dowel is in the range of Hv450 to 1000, the respective surface being selected within said ranges such that the surface hardness of said blade dowel is always higher than the surface hardness of said blade arm, said blade arm and said blade dowel being subjected to a chemical polishing treatment, said blade dowel being plated with nickel, chromium, palladium or rhodium, and a material of said blade dowel is one of a free-cutting stainless steel one of a carbon tool steel, and a material of said blade arm is a titanium material.

* * * * *